(12) United States Patent
Bekele

(10) Patent No.: US 6,673,406 B2
(45) Date of Patent: Jan. 6, 2004

(54) HIGH BARRIER POLYVINYLIDENE CHLORIDE COMPOSITION AND FILM

(75) Inventor: Solomon Bekele, Taylors, SC (US)

(73) Assignee: Cryovac, Inc., Duncan, SC (US)

( * ) Notice: Subject to any disclaimer, the term of this patent is extended or adjusted under 35 U.S.C. 154(b) by 145 days.

(21) Appl. No.: 09/977,554

(22) Filed: Oct. 15, 2001

(65) Prior Publication Data

US 2003/0099813 A1 May 29, 2003

(51) Int. Cl.$^7$ .................. B29D 22/00; B29D 23/00; B32B 27/08; C08K 5/10; C08K 5/11
(52) U.S. Cl. ............... 428/36.7; 428/516; 428/518; 428/36.91; 428/36.92; 428/35.7; 524/114; 524/306; 524/308; 524/310
(58) Field of Search ............... 428/36.7, 516, 428/518, 36.91, 36.92, 35.7; 524/114, 306, 308, 310

(56) References Cited

U.S. PATENT DOCUMENTS

| | | | |
|---|---|---|---|
| 5,030,511 A | 7/1991 | Moffitt | 428/336 |
| 5,538,770 A * | 7/1996 | Bekele | 428/36.7 |
| 5,571,614 A | 11/1996 | Harrison et al. | 428/331 |
| 5,578,372 A | 11/1996 | Murakami | 428/336 |
| 5,679,465 A | 10/1997 | Bekele | 428/474.4 |
| 5,726,229 A * | 3/1998 | Bekele | 524/114 |
| 5,747,560 A | 5/1998 | Christiani et al. | 523/209 |
| 5,759,702 A | 6/1998 | Bekele | 428/518 |
| 5,766,751 A | 6/1998 | Kotani et al. | 428/323 |
| 5,819,940 A | 10/1998 | Roulin et al. | 206/531 |
| 5,876,739 A | 3/1999 | Turnblad et al. | 424/408 |
| 5,914,194 A | 6/1999 | Bekele | 428/518 |
| 5,969,029 A | 10/1999 | Kotani et al. | 524/447 |
| 5,990,248 A | 11/1999 | Mori et al. | 525/444 |
| 6,007,885 A * | 12/1999 | Hallock | 428/35.7 |
| 6,045,924 A | 4/2000 | Bekele | 428/518 |
| 6,133,352 A | 10/2000 | Bekele | 524/114 |
| 6,403,231 B1 | 6/2002 | Mueller et al. | 428/474.4 |

OTHER PUBLICATIONS

"An Emerging Family of Nanomer® Nanoclays for the Plastics Industry", Nanocor–Technical Papers, Jul. 17, 2001, pp. 1–8.
"An Emerging Family of Nanomer® Nanoclays for Thermosets", Nanocor–Technical Papers, Jul. 17, 2001, pp. 1–6.
"Emerging Nanocomposite Technologies for Barrier and Thermal Improvements in Pet Containers", Nanocor–Technical Papers, Jul. 17, 2001, pp. 1–6.
"Cloisite® Nanoclays" Jim Chambers & Associates, Oct. 1, 2001, 9 pages (Internet).

* cited by examiner

Primary Examiner—Harold Pyon
Assistant Examiner—Catherine A. Simone
(74) Attorney, Agent, or Firm—Mark B. Quatt

(57) ABSTRACT

A polymeric film comprises at least one layer, the at least one layer comprising a vinylidene chloride composition, the composition comprising 100 parts, by weight of the composition, of a vinylidene chloride copolymer; between 0.1 and 10 parts, by weight of the composition, of a stabilizer; between 0.1 and 10 parts, by weight of the composition, of a lubricant; and between 0.1 and 10 parts, by weight of the composition, of a hydrophilic clay. Alternatively, a polymeric film includes at least one layer, the at least one layer including a vinylidene chloride composition, the composition including 100 parts, by weight of the composition, of a vinylidene chloride copolymer; between 0.1 and 10 parts, by weight of the composition, of a soap of a fatty acid; and between 0.1 and 10 parts, by weight of the composition, of a hydrophilic clay. A blister pack can be made from either film.

15 Claims, 3 Drawing Sheets

HIGH BARRIER POLYVINYLIDENE CHLORIDE COMPOSITION AND FILM

FIELD OF THE INVENTION

The present invention relates to compositions and films made from vinylidene chloride copolymers, especially films suitable for the packaging of pharmaceutical products in blister packs.

BACKGROUND OF THE INVENTION

The present invention relates to films suitable for making blister packs for pharmaceuticals.

Conventional blister packs typically include a base with one or, more commonly, a plurality of recesses that are surrounded by a shoulder, and a lid attached to the shoulder. Tablets, capsules, or other contents are accommodated in respective recesses, and may be removed therefrom by (1) pressing on the respective recess, thus making the contents penetrate the lid (usually an aluminum foil or the like), or by (2) removing the portion of the lid lying over the recess, thus gaining access to the contents of the recess.

In practice, a base is formed with recesses, and with a shoulder defining the base material in between the recesses; the recesses of the base are filled with tablets, etc.; the base, with the filled recesses, is covered with a lid; and the lid is sealed or otherwise adhered to the shoulder of the base.

The base of the blister pack is sometimes made up of an interior portion (to be adhered to the lid) of ACLAR™ PTFE (polychlorotrifluoroethylene), a material that is very expensive, and with less than optimal oxygen barrier properties. This material displays an MVTR of typically about 0.4 grams/m$^2$. The exterior portion of the base is often a PVC (polyvinyl chloride) of about 250 micrometers (10 mils) thickness. PVC, polyamides, polyolefins, polyesters are other materials which can be used to making the base. An aluminum foil can be added to the base.

The lid is typically made of aluminum foil or an aluminum foil laminate. Aluminum foil is a preferred material for the lids on blister packs as the thickness of the material employed requires relatively little force for it to rupture. Consequently, the energy for penetration is low and the aluminum exhibits essentially no elasticity. Plastic laminates may also be employed for the lid.

Some blister packs feature a lid provided with a line of weakness in the region of each recess. In others, each recess may be covered with an individual lid segment. Within the line of weakness or on each lid segment may be a tab for gripping which enables the individual recess to be exposed by peeling back the lid segment.

Provision of a vinylidene chloride copolymer, often referred to as "saran" or "PVDC", in a PVDC composition capable of providing a packaging film with a low moisture vapor transmission rate (MVTR), and preferably also a low oxygen transmission rate (OTR), would be desirable for applications such as the blister packaging of pharmaceutical products sensitive to both oxygen and moisture.

Stabilizers are often used in formulating PVDC-based compositions. These stabilizers reduce the thermal degradation of PVDC formulations during extrusion. Unfortunately, a trade-off in OTR and thermal stability must sometimes be made in designing such formulations. Thus, a composition having increased amounts of a stabilizer will sometimes result in enhanced thermal stability, but at the expense of oxygen barrier properties. Conversely, improved (lower) OTR can be obtained by lowering the relative amounts of stabilizer in the formulation, but this may result in a less stable PVDC composition.

The inventor has produced a composition that provides good moisture vapor and oxygen barrier properties, but without significant loss of thermal stability.

SUMMARY OF THE INVENTION

In a first aspect, a polymeric film comprises at least one layer, the at least one layer comprising a vinylidene chloride composition, the composition comprising 100 parts, by weight of the composition, of a vinylidene chloride copolymer; between 0.1 and 10 parts, by weight of the composition, of a stabilizer; between 0.1 and 10 parts, by weight of the composition, of a lubricant; and between 0.1 and 10 parts, by weight of the composition, of a hydrophilic clay.

In a second aspect, a polymeric film comprises at least one layer, the at least one layer comprising a vinylidene chloride composition, the composition comprising 100 parts, by weight of the composition, of a vinylidene chloride copolymer; between 0.1 and 10 parts, by weight of the composition, of a soap of a fatty acid; and between 0.1 and 10 parts, by weight of the composition, of a hydrophilic clay.

In a third aspect, a blister pack comprises a base, the base comprising a plurality of recesses, and a shoulder surrounding the recesses; a lid attached to the shoulder; and contents disposed in respective recesses; wherein at least one of the base and lid comprises a vinylidene composition, the composition comprising 100 parts, by weight of the composition, of a vinylidene chloride copolymer; between 0.1 and 10 parts, by weight of the composition, of a stabilizer; between 0.1 and 10 parts, by weight of the composition, of a lubricant; and between 0.1 and 10 parts, by weight of the composition, of a hydrophilic clay.

In a fourth aspect, a blister pack comprises a base, the base comprising a plurality of recesses, and a shoulder surrounding the recesses; a lid attached to the shoulder; and contents disposed in respective recesses; wherein at least one of the base and lid comprises a vinylidene composition, the composition comprising 100 parts, by weight of the composition, of a vinylidene chloride copolymer; between 0.1 and 10 parts, by weight of the composition, of a soap of a fatty acid; and between 0.1 and 10 parts, by weight of the composition, of a hydrophilic clay.

In a fifth aspect, a vinylidene chloride composition comprises 100 parts, by weight of the composition, of a vinylidene chloride copolymer; between 0.1 and 10 parts, by weight of the composition, of a stabilizer; between 0.1 and 10 parts, by weight of the composition, of a lubricant; and between 0.1 and 10 parts, by weight of the composition, of a hydrophilic clay.

In a sixth aspect, a vinylidene chloride composition comprises 100 parts, by weight of the composition, of a vinylidene chloride copolymer; between 0.1 and 10 parts, by weight of the composition, of a soap of a fatty acid; and between 0.1 and 10 parts, by weight of the composition, of a hydrophilic clay.

Definitions

"(meth)acrylic acid" herein refers to both acrylic acid and/or methacrylic acid;

"(meth)acrylate" herein refers to both acrylate and methacrylate;

"polymer" herein refers to the product of a polymerization reaction, and is inclusive of homopolymers, copolymers, terpolymers, tetrapolymers, etc.;

"copolymer" herein refers to a polymer formed by the polymerization reaction of at least two different monomers and is inclusive of random copolymers, block copolymers, graft copolymers, etc.;

"ethylene/alpha-olefin copolymer" (EAO) herein refers to copolymers of ethylene with one or more comonomers selected from $C_3$ to $C_{10}$ alpha-olefins such as propene, butene-1,hexene-1, octene-1, etc. in which the molecules of the copolymers comprise long polymer chains with relatively few side chain branches arising from the alpha-olefin which was reacted with ethylene. This molecular structure is to be contrasted with conventional high pressure low or medium density polyethylenes which are highly branched with respect to EAOs and which high pressure polyethylenes contain both long chain and short chain branches. EAO includes such heterogeneous materials as linear medium density polyethylene (LMDPE), linear low density polyethylene (LLDPE), and very low and ultra low density polyethylene (VLDPE and ULDPE), such as DOWLEX™ or ATTANET™ resins supplied by Dow, ESCORENET™ or EXCEED™ resins supplied by Exxon; as well as linear homogeneous ethylene/alpha olefin copolymers (HEAO) such as TAFMER™ resins supplied by Mitsui Petrochemical Corporation, EXACT™ resins supplied by Exxon, or long chain branched (HEAO) AFFINITY™ resins supplied by the Dow Chemical Company, or ENGAGE™ resins supplied by DuPont Dow Elastomers;

"package" herein refers to a film configured around a product;

"film" herein refers to plastic web materials having a thickness of 0.50 mm (20 mils) or less such as 0.25 mm (10 mils) or less;

"seal layer" herein refers to a layer of a film that can be involved in the sealing of the film to itself or another layer;

"seal" herein refers to a bonding of a first film surface to a second film surface created by heating (e.g., by means of a heated bar, hot air, infrared radiation, ultrasonic sealing, etc.) the respective surfaces to at least their respective seal initiation temperatures;

"barrier" herein refers to a layer of a film that can significantly retard the transmission of one or more gases (e.g., $O_2$);

"abuse layer" herein refers to a layer of a film that can resist abrasion, puncture, and/or other potential causes of reduction of package integrity, and/or potential causes of reduction of package appearance quality;

"tie layer" herein refers to a layer of a film that can provide interlayer adhesion to adjacent layers that include otherwise nonadhering or weakly adhering polymers;

"bulk layer" herein refers to a layer of a film that can increase the abuse resistance, toughness, or modulus of a film;

"lamination" herein refers to the bonding of two or more film layers to each other, e.g. by the use of polyurethane adhesive;

"total free shrink" means the percent dimensional change in a 10 cm×10 cm specimen of film, when shrunk at a specified test temperature such as 85° C. (185° F.), with the quantitative determination being carried out according to ASTM D 2732, as set forth in the 1990 Annual Book of ASTM Standards, vol. 08.02, 368–371, the entire disclosure of which is incorporated herein by reference. "Total free shrink" refers to the totality of the free shrink in both the longitudinal direction and the transverse direction.

"machine direction" herein refers to the direction along the length of a film, i.e., in the direction of the film as it is formed during extrusion and/or coating; and "transverse direction" herein refers to the direction across a film, i.e., the direction that is perpendicular to the machine direction.

"Linear low density polyethylene" (LLDPE) herein refers to polyethylene having a density between 0.917 and 0.925 grams per cubic centimeter, made by Zeigler/Natta catalysis.

"Linear medium density polyethylene" (LMDPE) herein refers to polyethylene having a density between 0.926 grams per cubic centimeter and 0.939 grams per cubic centimeter, made by Zeigler/Natta catalysis.

The term "orientation ratio" (i.e., the product of the extent to which a film is oriented in several directions, usually two directions perpendicular to one another) is used when describing the degree of orientation of a given film. Orientation in the machine direction is referred to as "drawing", whereas orientation in the transverse direction is referred to as "stretching". For films extruded through an annular die, stretching is obtained by blowing the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls.

All compositional percentages used herein are presented on a "by weight" basis, unless designated otherwise.

BRIEF DESCRIPTION OF THE DRAWINGS

A detailed description of embodiments of the invention follows, with reference to the attached drawings, wherein.

DETAILED DESCRIPTION OF THE INVENTION

Figure 1:
FIG. 1 is a schematic cross-section of a monolayer film.

FIG. 1 of the present specification shows a monolayer film 10 having a single layer 11.

Layer 11 comprises the vinylidene chloride composition of the invention.

Figure 2:
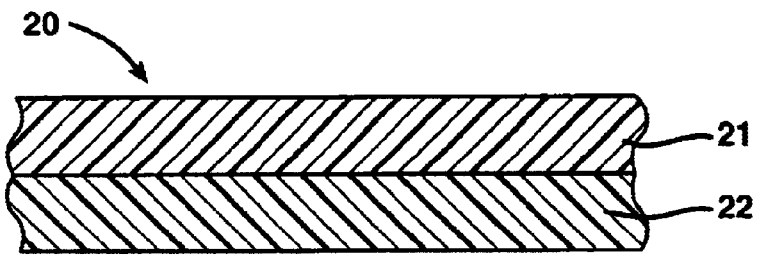
FIG. 2 is a schematic cross-section of a two layer film.

FIG. 2 shows a two layer film 20 having a layer 21 and a layer 22.

Layer 21 comprises the vinylidene chloride composition disclosed above for layer 11 of FIG. 1.

Layer 22 can comprise any suitable polymeric material, such as a thermoplastic polymeric material, such as an olefinic polymer, such as an ethylenic polymer, such as an ethylenic homopolymer or copolymer, such as ethylene/alpha-olefin copolymer, such as heterogeneous or homogeneous ethylene/alpha-olefin copolymers.

Layer 22 can comprise an olefinic polymer or copolymer such as ethylene/vinyl acetate copolymer; ethylene/alkyl acrylate copolymer; ethylene/(meth)acrylic acid copolymer; ionomer; propylene homopolymer and copolymer; and butylene homopolymer and copolymer.

Blends of any of the herein disclosed materials for layer 22 can be included in layer 22.

Figure 3:
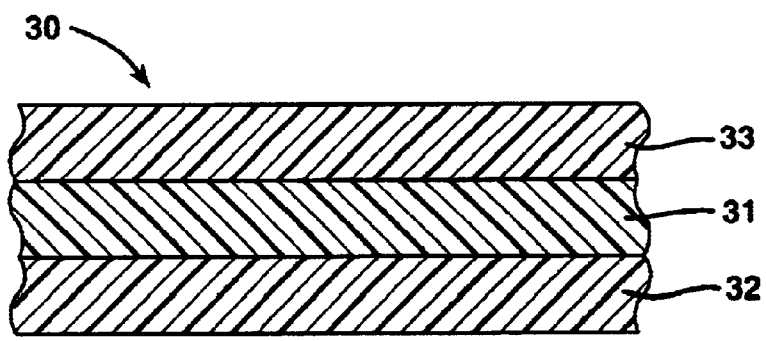
FIG. 3 is a schematic cross-section of a three layer film.

FIG. 3 shows a three layer film 30 having a layers 31, 32, and 33.

Layer 31 comprises the vinylidene chloride composition disclosed above for layer 11 of FIG. 1.

Layers 32 and 33 comprises any of the polymers disclosed above for layer 22 of FIG. 2.

Layers 32 and 33 can be the same, or can be different. The difference can be in composition, in one or more physical properties, in thickness, in amount or type of additives, in degree of crosslinking or orientation, or the like. For example, layer 32 can comprise an ethylene/vinyl acetate with 6% vinyl acetate, while layer 33 can comprise an ethylene/vinyl acetate with 9% vinyl acetate. As another example, layer 32 can comprise an ethylene/vinyl acetate with 6% vinyl acetate, while layer 33 can comprise an ethylene/alpha-olefin copolymer. Film structures in accordance with the invention can thus be depicted as A/B/A or as A/B/C, where A, B, and C each represent a distinct layer of a multilayer film.

Figure 4:
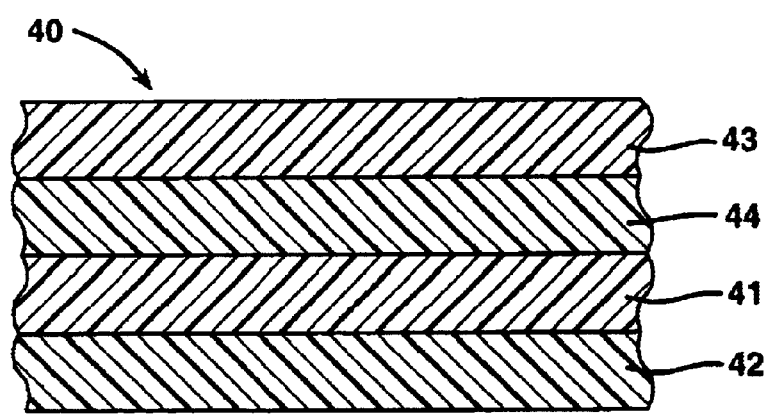
FIG. 4 is a schematic cross-section of a four layer film.

A preferred multilayer film structure according to the present invention has at least four layers. Such a film 40 (see FIG. 4) includes a seal layer 43, a bulk layer 44, an $O_2$-barrier layer 41 comprising the vinylidene chloride composition, and an abuse layer 42. Layers 43, 41, and 42 correspond in composition to layers 13, 11, and 12 respectively of the previous figures. The bulk layer 44 preferably is disposed between the seal layer 43 and the $O_2$-barrier layer 41, and the $O_2$-barrier layer 41 preferably is disposed between the bulk layer 44 and the abuse layer 42. If desired, tie layers, comprising polymeric adhesives, can be disposed between the seal layer 43 and the bulk layer 44, as well as between the $O_2$-barrier layer 41 and the abuse layer 42.

Bulk layer 44 can comprise any of the materials disclosed for layers 32 and 33 of FIG. 3.

Film of the present invention can have any total thickness desired, so long as the film provides the desired properties for the intended end use. Thicknesses can range from 0.1 to 20 mils, such as 0.3 to 16 mils, 0.5 to 12 mils, 0.7 to 8 mils, 1.0 to 6 mils, and 1.3 to 4 mils.

Figure 5:
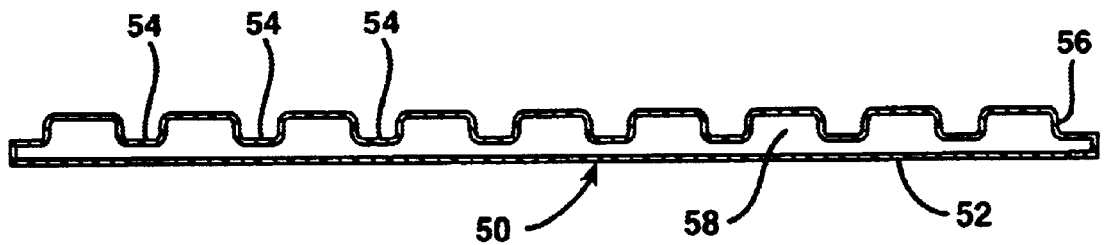
FIG. 5 shows a longitudinal section through a blister pack.
Figure 6:
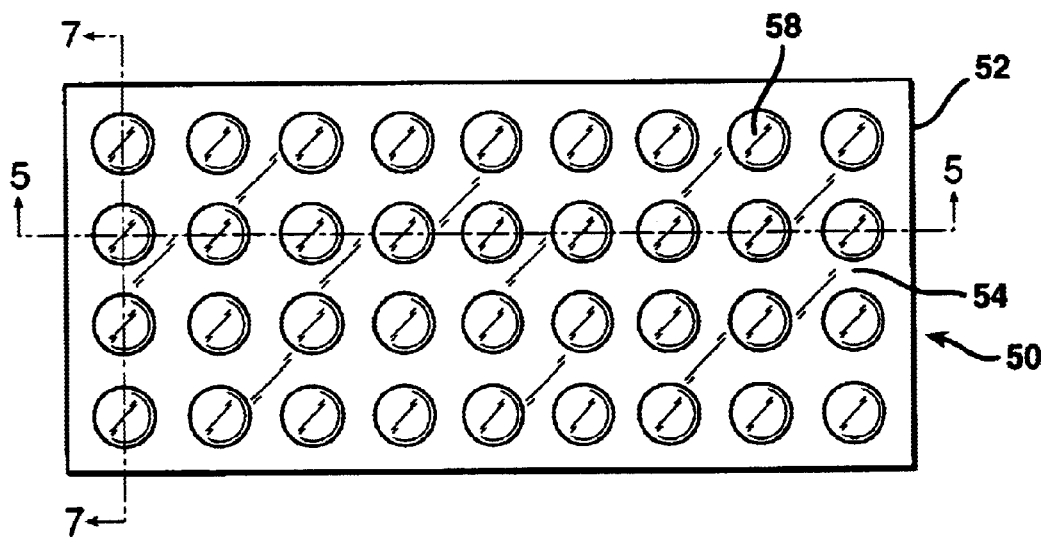
FIG. 6 shows a plan view of the blister pack of FIG. 5.
Figure 7:
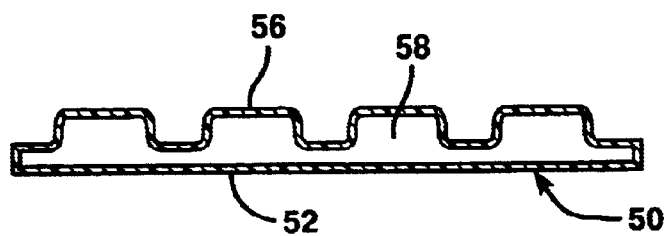
FIG. 7 shows a cross-section through the blister pack of FIG. 6.

FIG. 6 shows a conventional blister pack 50 for packaging pharmaceutical products such as tablets. The lid 52 is joined to the base 56 at the shoulders 54 of base 56 (see also FIG. 5). A plurality of recesses 58, each designed to accommodate a tablet, capsule, or other pharmaceutical product, are covered by lid 52. The lid 52 is conventionally a metal or metallized foil. FIG. 5 shows a longitudinal section through the blister pack 50. The base 56 with recesses 58 makes contact with the lid 52 at the shoulders 54. In the region of the shoulders 54 the lid 52 is joined to the base 56, e.g. by sealing or adhesive bonding (sealing/adhesive not shown for sake of clarity). FIG. 7 shows a cross-section through the blister pack 50 with its base 56, lid 52 and recesses 58.

Figure 8:
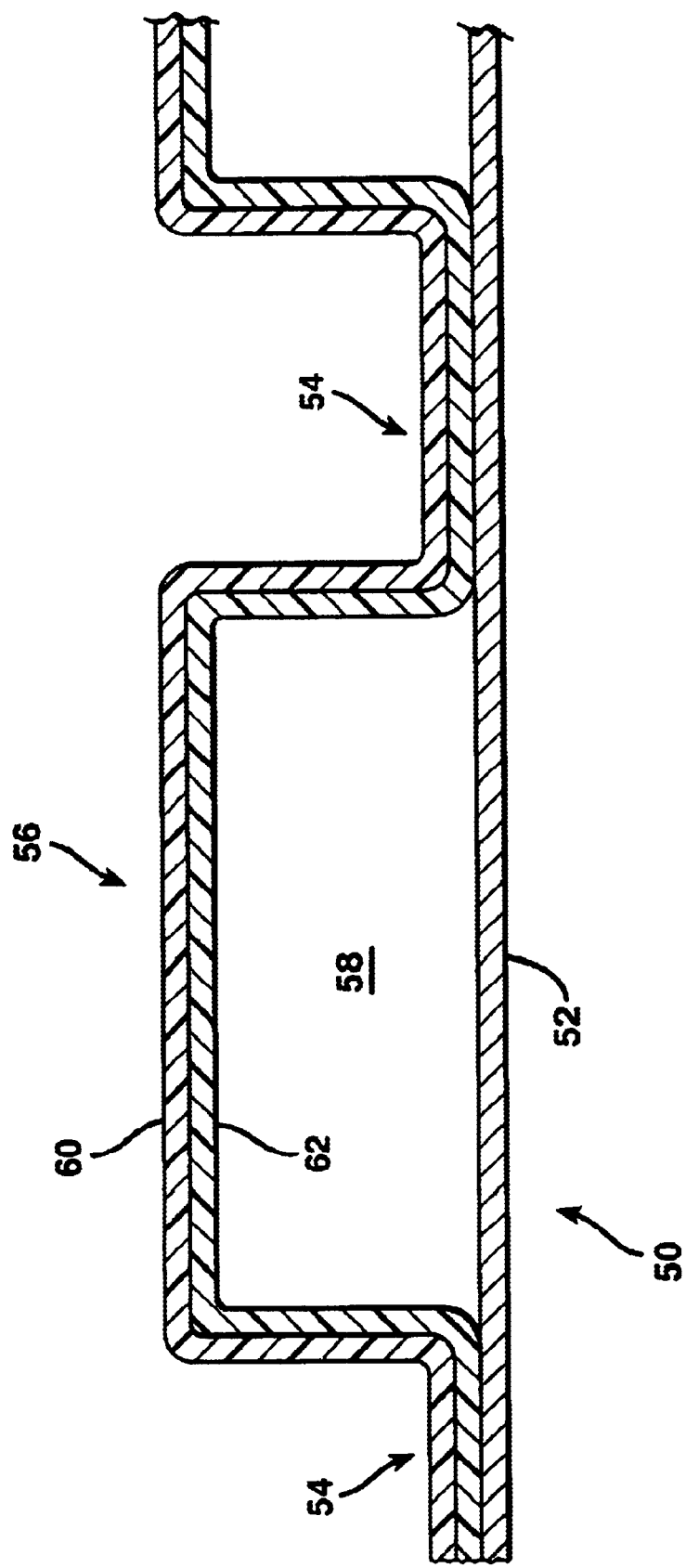
FIG. 8 shows an expanded fragmentary cross-sectional view of the blister pack of FIG. 6.

FIG. 8 shows an expanded fragmentary sectional view of blister pack 50, using film of the present invention. Base 56 is made up of an interior film 62 and an exterior film 60.

Interior film 62 comprises the film of the present invention. Preferably, film 62 is the collapsed lay-flat film of Example 14. This film provides good (low) MVTR as well as low OTR for pharmaceutical applications.

Exterior film 60 can be any suitable film, such as the PVC (polyvinyl chloride) film used in some blister packages.

Alternatively, the base can comprise a single film comprising the film of the present invention, without the need for an additional film 60.

In another alternative, the film of the invention can comprise the exterior film, and another film can form the interior film 62.

Those skilled in the art will understand that various combinations can be made, provided a film of the invention is present in the base.

In yet another embodiment, the film of the invention can form the lid of the blister pack, and a conventional foil or plastic film can form the base.

Films 62 and 60 can be bonded together by any suitable means, such as lamination, coextrusion, extrusion coating, extrusion lamination, heat sealing, gluing, etc.

The base of the present blister pack can be embossed, deep drawn or vacuum shaped.

The lid preferably comprises an aluminum foil or a laminate containing aluminum foil, or a plastic that exhibits low elasticity and poor stretching properties.

The base will typically have between 6 and 30 recesses in the form of cups or dishes. The recesses are surrounded by a shoulder, the shoulder forming an interconnected flat plane. The base can be prepared e.g. as an endless strip with the contents in the recesses and brought together with the lid, in particular in lid foil form, likewise in the form of an endless strip. The lid covers the base completely and e.g. by sealing or adhesive bonding is joined to the base at the shoulders. The lid can be sealed or adhesively bonded to the shoulder over the whole area or, by choosing a special sealing tool or bonding pattern for the purpose, this sealing or bonding may be only partial. Next, the endless strip of lidded base can be cut to the desired size. This may be performed e.g. using a stamping tool. At the same time, the blister pack may be given outer contours, or it is possible to provide weaknesses in the lid material or the base in order to allow the blister pack to be bent or to create lid segments, making easy removal of the lid segment and removal of the contents possible.

The general structure of each film of Table 1 was:

LLDPE/EVA//PVDC/EVA

Each of examples 1 to 4, and comparative example 1, was made by mixing the components of the respective PVDC composition, as defined in Table 1, and then extruding the resultant composition as follows. The first and second layers (LLDPE/EVA layers) were extruded through a tubular extrusion die, and then irradiated by electron beam irradiation. The PVDC/EVA layers were extrusion coated onto the substrate. The resulting film was then inflated and biaxially oriented in a trapped bubble orientation system, at an orientation ratio of about 3.5:1 in each of the longitudinal and transverse directions, and then collapsed on itself to form a roll of film. The resulting film had a thickness of between 1.5 and 3 mils.

Example 5 and comparative example 2, of Table 2, were like the film structure of Table 1, but were cast coextruded, and were not irradiated or oriented. Final films had a total thickness of between 2 and 4 mils.

The films and comparatives of both Tables 1 and 2 were made by conventional extrusion and post-extrusion processes well known in the art.

Tables 1 and 2 demonstrate the improvements obtained by the practice of the present invention.

TABLE 1

| Component, phr[1] | Comparative Example 1 | Example 1 | Example 2 | Example 3 | Example 4 |
|---|---|---|---|---|---|
| VDC/MA[2] | 100 | 100 | 100 | 100 | 100 |
| ESO[3] | 2 | 2 | 2 | 1.5 | 1.5 |
| PA[4] | 2 | 2 | 2 | 1.5 | 1.5 |
| Acid Scavenger[5] | — | — | — | 0.5 | 0.5 |
| Co-stabilizing Lubricant[6] | — | — | — | 0.5 | 0.5 |
| CLOISITE ™ 15A[11] | — | — | — | — | 2 |
| CLOISITE ™ 20A[7] | — | 2 | 4 | — | — |
| NANOMER ™ I.31PS[8] | — | — | — | 2 | — |
| OTR[9] cc.mil/sq.m.day.atm at 73° F. | 3.8 | 2.4 | 2.0 | 2.4 | 1.8 |
| MVTR[10], g/sq.m.day at 100% RH and 100° F. | 1.30 | 0.99 | 0.83 | 0.90 | 0.65 |

In Table 1:

[1]"phr" means pounds per hundred (weight units) of material. Thus, by way of example, in the film of Example 1, the equivalent of 100 pounds of the DOW MA134 resin was blended with 2 pounds of the FERRO ™ PLASCHEK ™ 775 material, 2 pounds of the ME-TABLEN ™ L1000 material, and 2 pounds of the CLOISITE ™ 20A hydrophilic clay. An equivalent to phr is "parts by weight".
[2]DOW ™ MA134, a PVDC copolymer with 8.5 weight % methylacrylate comonomer.
[3]ESO is FERRO ™ PLASCHEK ™ 775, an epoxidized soybean oil
[4]PA is ELF ATOCHEM ™ METABLEN ™ L1000, an acrylic lubricant.
[5]Acid scavenger is MITSUI ™ DHT4A, a magnesium aluminum hydroxycarbonate of formula $Mg_{4.5}Al_2(OH)_{13}CO_3.5H_2O$.
[6]Co-stabilizing lubricant is HENKEL ™ LOXIOL ™ VPG1732, a high molecular weight complex ester or CASCHEM ™ CASTOWAX ™ NF, a hydrogenated castor oil
[7/11]CLOISITE ™ 20A/CLOISITE ™ 15A are oxonium ion modified montmorillonite clay from Southern Clay Products
[8]NANOMER ™ 1.31PS is oxonium ion modified montmorillonite clay from Nanocor.
[9]ASTM D-3985-95.
[10]ASTM F 1249-90 (reapproved 1995).

TABLE 2

| Blend Composition | Comparative Example 2 | Example 5 |
|---|---|---|
| SOLVAY ™ LV875 | 100 phr | 100 phr |
| ESO[3] | 1.5 phr | 1.5 phr |
| Acid Scavenger[DHT-4A][5] | 1.0 phr | 1.0 hr |
| Co-stabilizing Lubricant: Calcium Ricinoleate | 1.0 phr | 1.0 phr |
| CLOISITE ™ 15A[11] | — | 1.5 phr |
| OTR, cc(mil)/m².day.atm at 73° F. and 0% RH[9] | 1.40 | 0.86 |
| MVTR, g/m²(mil) at 100° F. and 100% RH[10] | 0.80 | 0.48 |

The SOLVAY ™ LV875 of Table 2 is a PVDC with a comonomer content of between 4 and 6.5% wt % methyl acrylate comonomer.

The vinylidene chloride copolymer (PVdC) of the invention can be any suitable vinylidene chloride-containing polymer copolymer, i.e., a polymer that includes monomer units derived from vinylidene chloride ($CH_2=CCl_2$) and also monomer units derived from one or more of vinyl chloride, styrene, vinyl acetate, acrylonitrile, and $C_1$–$C_{12}$ alkyl esters of (meth)acrylic acid (e.g., methyl acrylate, butyl acrylate, methyl methacrylate, etc.). Thus, suitable PVDC resins include e.g. one or more of vinylidene chloride/vinyl chloride copolymer, vinylidene chloride/methyl acrylate copolymer, vinylidene chloride/acrylonitrile copolymer, vinylidene chloride/butyl acrylate copolymer, vinylidene chloride/styrene copolymer, and vinylidene chloride/vinyl acetate copolymer. The weight percent of the vinylidene chloride monomer is preferably between 75% and 96% by weight of the copolymer; the weight percent of the second monomer, e.g. vinyl chloride, is preferably between 4% and 25% by weight of the copolymer.

Commercial examples of vinylidene chloride copolymer are DOW™ MA134 available from Dow Chemical Company, and SOLVAY™ LV875 and SOLVAY™ LV897, both available from Solvay.

The stabilizer of the invention can include one or more of:
1) epoxidized compounds, such as epichlorohydrin/bisphenol A, epoxidized soybean oil, epoxidized linseed oil, butyl ester of epoxidized linseed oil fatty acid, epoxidized octyl tallate, epoxidized glycol dioleate, and the like, and mixtures thereof;
2) oxidized polyethylene;
3) 2-ethyl hexyl diphenyl phosphate;
4) chlorinated polyethylene;
5) tetraethylene glycol di(2-ethylhexoate);
6) a metal salt of a weak inorganic acid, e.g., tetrasodium pyrophosphate; and 7) a soap of a fatty acid, e.g., calcium ricinoleate.

Commercial examples of epoxidized compounds include epichlorohydrin/bisphenol A, an epoxy resin available from Shell as EPON™ 828; epoxidized soybean oil, available from Viking Chemical Company as Vikoflex 7177; epoxidized linseed oil, available from Viking Chemical Company as Vikoflex 7190; butyl ester of epoxidized linseed oil fatty acid, available from Viking Chemical Company as Vikoflex 9040; epoxidized octyl tallate, available from C. P. Hall Company as Monoplex S-73; and epoxidized glycol dioleate, available from C. P. Hall Company as Monoplex S-75.

The stabilizer can comprise 0.1, 0.5, 1, 2, 3, 4, 5, 6, 7, 8, 9, or 10 parts by weight of the vinylidene chloride composition of the invention. Preferably, the stabilizer comprises between 0.5 and 5, such as between 1 and 3, such as between 1.5 and 2 parts by weight of the vinylidene chloride composition of the invention.

Commercial examples of a stabilizer include FERRO™ PLASCHEK™ 775, an epoxidized soybean oil, and calcium ricinoleate available from Acme-Hardesty Company.

The lubricant of the invention can include one or more of:

1) a soap of a fatty acid, e.g., calcium ricinoleate;
2) a terpolymer having an acrylate comonomer, such as methyl methacrylate/butyl acrylate/styrene terpolymer; methyl methacrylate/butyl acrylate/butyl methacrylate terpolymer; or blends thereof;
3) n-(2-hydroxyethyl)-12 hydroxy stearamide; and
4) propylene glycol mono-ricinoleate.

The lubricant can comprise 0.1, 0.5, 1, 2, 3, 4, 5, 6, 7, 8, 9, or 10 parts by weight of the vinylidene chloride composition of the invention. Preferably, the lubricant comprises between 0.5 and 5, such as between 1 and 3, such as between 1.5 and 2 parts by weight of the vinylidene chloride composition of the invention.

A commercial example of a lubricant is ELF ATOCHEM™ METABLEN™ L1000, an acrylic lubricant.

It will be noted that a soap of a fatty acid, e.g., calcium ricinoleate, can function as both a stabilizer and a lubricant. In this embodiment, the soap of the fatty acid can comprise 0.1, 0.5, 1, 2, 3, 4, 5, 6, 7, 8, 9, or 10 parts by weight of the vinylidene chloride composition of the invention. Preferably, the soap of a fatty acid comprises between 0.5 and 5, such as between 1 and 3, such as between 1.5 and 2 parts by weight of the vinylidene chloride composition of the invention.

Other co-stabilizing lubricants can optionally be included in the composition, such as HENKEL™ LOXIOL™ VPG1732, a high molecular weight complex ester, and CASCHEM™ CASTOWAX™ NF, a hydrogenated castor oil.

The hydrophilic clay of the invention can include one or more clays of the smectite group, including one or more of:
1) dioctahedral clays such as montmorillonite, beidellite, and nontronite, and
2) trioctahedral clays such as saponite, hectorite, and sauconite;
and in particular oxonium ion modified forms of these clays.

The hydrophilic clay can comprise 0.1, 0.5, 1, 2, 3, 4, 5, 6, 7, 8, 9, or 10 parts by weight of the vinylidene chloride composition of the invention. Preferably, the hydrophilic clay comprises between 0.5 and 8, such as between 1 and 5, such as between 1.5 and 4 parts by weight of the vinylidene chloride composition of the invention.

Commercial examples of hydrophilic clays include CLOISITE™ 20A and CLOISITE™ 15A, which are oxonium ion modified montmorillonite clay from Southern Clay Products, and NANOMER™ 1.31 PS, which is an oxonium ion modified montmorillonite clay from Nanocor.

Optionally, the composition and film of the invention can include an acid (hydrogen chloride) scavenger. If present, the acid scavenger can comprise between 0.1 and 4, preferably between 0.5 and 2, parts by weight of the vinylidene chloride composition of the invention.

A commercial example of an acid scavenger is MITSUI™ DHT4A, a magnesium aluminum hydroxycarbonate of formula $Mg_{4.5}Al_2(OH)_{13}CO_3 \cdot 3.5H_2O$.

The composition of the invention offers the advantage of greater $O_2$-barrier per amount of PVDC present, so that the amount of PVDC can be reduced to match a preexisting degree of $O_2$-barrier, and/or the degree of $O_2$-barrier can be increased for a given amount of PVDC.

Determination of the overall thermal stability of PVDC blends can be carried out by working the blend between a pair of heated rollers or inside a heated mixing chamber. The time required to produce a noticeably blackened polymer due to shear degradation and temperature-induced degradation is a measure of the effectiveness of the processing aid/HCl scavenger combination in promoting heat stability of the PVDC. Commercially acceptable vinylidene chloride copolymer blends show thermal stability times of about 10 minutes in a mixing device such as a Brabender™ blender running at about 168° C. (335° F.) and 63 revolutions per minute.

The composition of the invention can be extruded and processed in any of a number of methods known to those of ordinary skill in the art so as to form a film or a layer of a multilayer film, for example, by the methods disclosed in U.S. Pat. Nos. 3,741,253 (Brax et al.), 4,278,738 (Brax et al.), and 4,284,458 (Schirmer) all incorporated herein by reference in their entirety. Thus, any suitable method of making a film having an oxygen barrier layer can be used to make a film in accordance with the present invention, so long as the method utilizes an above-described PVDC composition. Suitable methods include tubular cast coextrusion, such as that shown in U.S. Pat. No. 4,551,380 [Schoenberg], herein incorporated by reference in its entirety, tubular or flat cast extrusion, or blown bubble extrusion (for monolayer films) or coextrusion (for multilayer films) by techniques well known in the art. Multilayer films can be made by coextrusion, extrusion coating, extrusion lamination, corona bonding or conventional lamination of all the film layers. A method of producing a multilayer film having a PVDC layer is disclosed in U.S. Pat. No. 4,112,181, issued on Sep. 5, 1978 to Baird, Jr. et al., incorporated herein by reference in its entirety. This patent describes a method of coextruding a tubular film wherein the walls of the tube have at least three layers, a center layer being a PVDC layer. The tubular film is subsequently biaxially oriented by the trapped bubble technique. The 3-layer film may be cross-linked by electron beam irradiation.

A satisfactory method of producing a multilayer saran film is disclosed in U.S. Pat. No. 3,741,253, issued on Jun. 26, 1973 to Brax et al, incorporated herein by reference in its entirety, which discloses a multilayer, biaxially oriented film having a PVDC barrier layer. This film is made by an extrusion coating process in which a substrate layer or layers of a polymer such as polyethylene or ethylene vinyl acetate copolymer is extruded in the form of a tube, cross-linked by irradiation, and inflated. A layer of PVDC is extrusion coated onto the inflated tubing, and another layer or layers of polymer is simultaneously or sequentially extrusion coated onto the PVDC. After cooling, this multi-layer tubular structure is flattened and rolled up. Then, the tube is inflated, and heated to its orientation temperature, thereby biaxially orienting the film. The bubble is rapidly cooled to set the orientation. This process produces a heat shrinkable barrier film with low oxygen permeability. Also, the advantages of a cross-linked film are provided without subjecting the PVDC layer to irradiation which tends to degrade saran. The barrier layer in the examples of the patent to Brax et al is a plasticized copolymer of vinylidene chloride and vinyl chloride.

The film of the invention can be cross-linked or non-cross-linked, oriented or unoriented, heat shrinkable or non-heat shrinkable. Where the film is heat shrinkable, it has a total free shrink at 85° C. (185° F.) of between 10 and 100%. All or a portion of the film of the present invention can be irradiated to induce crosslinking. In the irradiation process, the film is subjected to an energetic radiation treatment, such as corona discharge, plasma, flame, ultraviolet, X-ray, gamma ray, beta ray, and high energy electron treatment, which induces crosslinking between molecules of the irradiated material. The proper dosage level can be determined by standard dosimetry methods known to those of ordinary skill in the art, and the precise amount of radiation to be used is of course dependent on the particular film structure and its end use. The film can be irradiated at a level of from 0.5–15 megarads (MR), such as 1–12 MR. Further details on the irradiation of polymeric films can be found in, for example, U.S. Pat. Nos. 4,064,296 (Bornstein et al.), 4,120,716 (Bonet), and 4,879,430 (Hoffman), all incorporated herein by reference in their entirety.

The following additional examples of a film of the invention are made by tubular coextrusion, and by extrusion coating. In the latter case, a substrate is extruded or coextruded, optionally irradiated, then optionally stretch oriented; and then a layer of a blend of PVDC as disclosed herein is extrusion coated, optionally with at least one additional layer, to the substrate.

TABLE 3

| Example | Film Structure |
|---|---|
| 6 | A/B |
| 7 | A/C |
| 8 | B/A/B |
| 9 | C/A/C |
| 10 | C/A/B |
| 11 | B/A/D/B |
| 12 | C/A/D/C |
| 13 | C/A/D/B |

In Table 3:
A = PVDC.
B, C, and D = any of the materials disclosed above for layers 43, 44, and 42 of FIG. 4.

The polymeric components used to fabricate film according to the present invention can also contain appropriate amounts of other additives normally included in or blended with such compositions. These include slip agents, antioxidants, fillers, dyes, pigments, radiation stabilizers, antistatic agents, elastomers, and other additives known to those of skill in the art of packaging films.

EXAMPLE 14

A four layer film is coextruded by a hot blown process as an annular tube, the film having the construction:

$EVA_1/EVA_2/PVDC/EVA_2$

Where:
$EVA_1$=EVA with 3.3 wt. % vinyl acetate content, available from Huntsman as PE1335™.
PVDC=vinylidene chloride/methyl acrylate copolymer available from Solvay as SOLVAY™ LV897, having a methyl acrylate content of between 4.0 and 6.0 weight %.
$EVA_2$=EVA with 28 wt. % vinyl acetate content, available from DuPont as ELVAX™3182-2.

After extrusion, the tubular coextrudate is collapsed on itself to form a lay flat film having the construction:

$EVA_1/EVA_2/PVDC/EVA_2//EVA_2/PVDC/EVA_2/EVA_1$

A preferred thickness for each PVDC layer is 0.75 mils.
This "doubling" of the film construction doubles the total thickness of the PVDC barrier layer (to e.g. 1.5 mils), enhancing (lowering) both the OTR and the MVTR values of the final film, and offering additional protection to pharmaceutical products contained in packages made from the inventive film.

EXAMPLE 15

A four layer film like that of Example 14 is made, by a cast coextrusion process, but where the outer $EVA_1$ layer is replaced with a LLDPE. The film thus has the construction:

$LLDPE/EVA_2/PVDC/EVA_2$

Two commercial LLDPE resins, each useful for Example 15, are DOWLEX 2045.03 and DOWLEX 2045.04, each available from Dow. Each of these is an ethylene/octene-1 copolymer with a 6.5 weight % octene content, and a density of 0.920 grams/cc.

The multilayer film of the present invention can have any total number of layers and any total thickness desired as long as the film provides the desired properties for the particular packaging operation in which the film is used The film layer comprising PVDC can be irradiated up to a dosage level of 15 MR without significant change to (degradation of) the film. However, chlorinated species are generated and may not be FDA accepted.

As is known to those of skill in the art, the use of a polymer comprising mer units derived from vinylidene chloride and methyl acrylate reduces the degrading effect of irradiation on the PVDC].

The film of the invention can be laminated, adhesively adhered, extrusion coated, or extrusion laminated onto a substrate to form a laminate. Lamination can be accomplished by joining layers with adhesives, joining with heat and pressure, and even spread coating and extrusion coating.

The film of the present invention is especially suitable for packaging applications in which the product(s) being packaged preferably is to be protected from atmospheric $O_2$. More particularly, film according to the present invention is especially useful as blister packaging for pharmaceuticals, as a film suitable for use as a barrier bag, and as a film suitable for use in a patch bag.

A blister package can be made, with the above-disclosed PVDC composition and the film made therefrom, by conventional techniques and in a conventional packaging format.

What is claimed is:

1. A polymeric film comprising at least one layer, the at least one layer comprising a vinylidene chloride composition comprising:
    a) 100 parts, by weight of the composition, of a vinylidene chloride copolymer;
    b) between 0.1 and 10 parts, by weight of the composition, of a stabilizer;
    c) between 0.1 and 10 parts, by weight of the composition, of a lubricant; and
    d) between 0.1 and 10 parts, by weight of the composition, of a hydrophilic clay.

2. The film of claim 1 wherein the stabilizer is selected from the group consisting of:
    a) epoxidized compounds;
    b) oxidized polyethylene;
    c) 2-ethyl hexyl diphenyl phosphate;
    d) chlorinated polyethylene;
    e) tetraethylene glycol di(2-ethylhexoate); and
    f) a metal salt of a weak inorganic acid.

3. The film of claim 2 wherein the epoxidized compounds are selected from the group consisting of epichlorohydrin/bisphenol A, epoxidized soybean oil, epoxidized linseed oil, butyl ester of epoxidized linseed oil fatty acid, epoxidized octyl tallate, and epoxidized glycol dioleate.

4. The film of claim 1 wherein the lubricant is selected from the group consisting of:
    a) a terpolymer having an acrylate comonomer;
    b) n-(2-hydroxyethyl)-12 hydroxy stearamide; and
    c) propylene glycol mono-ricinoleate.

5. The film of claim 4 wherein the terpolymer having an acrylate comonomer is selected from the group consisting of methyl methacrylate/butyl acrylate/styrene terpolymer; and methyl methacrylate/butyl acrylate/butyl methacrylate terpolymer.

6. The film of claim 1 wherein the hydrophilic clay comprises at least one clay of the smectite group, the clay selected from the group consisting of:
 a) dioctehedral clays; and
 b) trioctahedral clays.

7. The film of claim 6 wherein the hydrophilic clay is selected from the group consisting of montmorillonite, beidellite, and nontronite.

8. The film of claim 1 wherein the hydrophilic clay is modified with oxonium ion.

9. The film of claim 1 wherein the composition comprises an acid scavenger.

10. A polymeric film comprising at least one layer, the at least one layer comprising a vinylidene chloride composition, composition comprising:
 a) 100 parts, by weight of the composition, of a vinylidene chloride copolymer;
 b) between 0.1 and 10 parts, by weight of the composition, of a soap of a fatty acid; and
 c) between 0.1 and 10 parts, by weight of the composition, of a hydrophilic clay.

11. The polymeric film of claim 10 wherein the soap of a fatty acid comprises calcium ricinoleate.

12. The film of claim 10 wherein the hydrophilic clay comprises at least one clay of the smectite group, the clay selected from the group consisting of:
 a) dioctehedral clays; and
 b) trioctahedral clays.

13. The film of claim 10 wherein the hydrophilic clay is selected from the group consisting of montmorillonite, beidellite, and nontronite.

14. The film of claim 10 wherein the hydrophilic clay is modified with oxonium ion.

15. The film of claim 10 wherein the composition comprises an acid scavenger.

* * * * *